United States Statutory Invention Registration [19]

[11] Reg. Number: H461

Wert, III

[43] Published: Apr. 5, 1988

[54] NON-REFLECTIVE/REFLECTIVE PHASE TRANSITION OPTICAL MODULATOR

[76] Inventor: John C. Wert, III, 3101 Kemp Rd., Dayton, Ohio 45431

[21] Appl. No.: 401,162

[22] Filed: Jul. 23, 1982

Related U.S. Application Data

[63] Continuation-in-part of Ser. No. 139,070, Apr. 10, 1980, abandoned, which is a continuation-in-part of Ser. No. 965,464, Nov. 30, 1978, abandoned.

[51] Int. Cl.[4] ..... H01S 3/00; H01S 3/115; H01S 3/08

[52] U.S. Cl. ..... 332/7.51; 372/12; 372/99

[58] Field of Search ..... 330/4.3; 332/7.51; 350/353

[56] References Cited

U.S. PATENT DOCUMENTS

| | | | |
|---|---|---|---|
| 3,371,978 | 3/1968 | Matovich | 350/160 |
| 3,379,998 | 4/1968 | Soules et al. | 331/94.5 |
| 3,426,294 | 2/1969 | Koester | 331/94.5 |
| 3,455,627 | 7/1969 | Letter | 350/160 |
| 3,484,722 | 12/1969 | Barker, Jr. et al. | 332/4 |
| 3,497,286 | 2/1970 | Morton et al. | 350/353 |
| 3,521,941 | 7/1970 | Des et al. | 350/353 |
| 3,555,455 | 1/1971 | Paine | 331/94.5 Q |
| 3,656,836 | 4/1972 | de Cremoux et al. | 350/160 |
| 3,664,726 | 5/1972 | Mattis | 350/160 |
| 3,879,108 | 4/1975 | Berets | 350/357 |
| 3,971,874 | 7/1976 | Ohta et al. | 428/432 |

OTHER PUBLICATIONS

Weiser et al., "Optically Erasing . . . Switchable Film", 12/73, pp. 2075–2076, IBM Tech. Disc. Bull., vol. 13, #7.

"Valiev et al, "Metal-Insulator . . . Field", 1970, pp. 18–22, Pis'ma Zh. Eksp. Teor. Fig. 12.1.

P. G. Eliseev & M. A. Man'ko "Use of a Semiconductor Mirror for Laser Q-Switching", Soviet Physics-Tech Physics, vol. 11, No. 12, Jun. 1967, pp. 1657–1658.

J. C. C. Fan et al, "Thin-Film $VO_2$ Submillimeter-Wave Modulators and Polarizers[a])" Applied Physics Ltr, vol. 31, No. 1, Jul. 1, 1977, pp. 11–13.

Vos, "Reflectance & Electroreflectance of $TiO_2$ Single Crystals . . . "J. Phys. C. Solid State Phys., vol. 10(19), 1977, pp. 3917–3918.

*Primary Examiner*—Stephen C. Buczinski

*Assistant Examiner*—Linda J. Wallace

*Attorney, Agent, or Firm*—Bobby D. Scearce; Donald J. Singer

[57] ABSTRACT

An optical modulator particularly suited for use as an output coupler from the resonating cavity of a laser. The modulator is fabricated with a semiconducting oxide compound selected from the group consisting of VO, $VO_2$, $V_2O_3$, $V_3O_5$, $V_4O_6$, $V_5O_9$, $V_6O_{11}$, $V_7O_{13}$, $V_8O_{15}$, $Ti_2O_3$, $Ti_4O_7$, $NbO_2$, $FeSi_2$, $VO_2NbO_2$, $V_{1-x}Mo_xO_2$, $VO_2$-$TiO_2$, $V_2O_3$-$Ti_2O_3$, $V_{1-x}Ge_xO_2$, $V_{1-x}Nb_xO_2$, $V_{1-x}Cr_xO_2$, $(Cr_xV_{1-x})_2O_3$ and $V_{1-x}Ti_xO_2$. When an electric field is applied to an output coupler fabricated with a thin film or single crystal of material from the foregoing group, the material undergoes a transition between metallic and semiconducting states. In the metallic state the output coupler reflects incident luminous energy. In the semiconducting state, on the other hand, the material transmits such luminous energy. Thereby, a laser system output coupler fabricated with a material from the above-defined group can, by external stimulation, be caused to reflect back or transmit out the laser energy stored within the resonating cavity. Furthermore, since transition between states can be performed with speeds ranging from microseconds to nanoseconds, the output coupler is compatible with the needs of Q-switched or cavity dumped laser configurations.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

NON-REFLECTIVE/REFLECTIVE PHASE TRANSITION OPTICAL MODULATOR

RIGHTS OF THE GOVERNMENT

The invention described herein may be manufactured and used by or for the Government of the United States for all governmental purposes without the payment of any royalty.

CROSS-REFERENCE TO RELATED APPLICATIONS

This application is a continuation-in-part of copending application assigned Ser. No. 06/139,070 and filed Apr. 10, 1980, now abandoned, which was a continuation-in-part of an application assigned Ser. No. 965,464 and filed on Nov. 30, 1978, now abandoned.

BACKGROUND OF THE INVENTION

1. Field of the Invention

The invention disclosed herein relates to modulators of luminous energy typified by that generated in lasers, and particularly those modulators fabricated with oxide compounds which undergo transitions between metallic and non-metallic states in response to external stimuli.

2. Description of the Prior Art

Modulators of luminous energy radiating in the infrared, visible and ultraviolet spectra are, as a general premise, known by those skilled in the related arts. Likewise, lasers and means for their control are generally known. What is lacking is a laser system luminous energy modulator which can be inserted into the output path of a laser and operate as a reflective mirror or output coupler, translating between states at the behest of an external control with sufficient speed to generate pulsed laser outputs.

The related art known to the inventor appears in U.S. Pat. No. 3,455,627 granted to inventor Eugene C. Letter and U.S. Pat. No. 3,656,836 granted to joint inventors Baudoin de Cremoux and Pierre Leclerc. The teachings of the patent to Letter disclose an optical element which alternates between reflecting and absorbing states in response to the thermal effects of high energy density luminous radiation. The transition is a self-initiated thermal phenomenon, with the device reverting to its prior state upon the dissipation of the thermal energy added by the incident radiation.

The other patent, de Cremoux et al, also addresses the modulation of luminous energy. The device disclosed in this patent is defined to undergo transition between a first transmission state and a second absorption state upon the formation of an electric field within the semiconductor material constituting the device. Thereby, the modulation characteristics of this device are readily amenable to external control.

Neither of the foregoing disclosures describe a modulating device particularly suited to the job of extracting luminous energy from the resonating cavity of a laser. Notwithstanding the multiplicity of known techniques for accomplishing such an objective, none approach the simplicity or efficiency of a device which can be induced to undergo transitions between highly reflective and transmissive states.

SUMMARY OF THE INVENTION

The subject matter of this invention is a particular group of semiconducting materials and their implementation to controllably extract luminous energy from the resonating cavity of a laser. Unlike the many complex and often inefficient techniques utilized by those practicing in the art, a device appropriately fabricated with one or more of the semiconductor materials from a group consisting of VO, $VO_2$, $V_2O_3$, $V_3O_5$, $V_4O_7$, $V_5O_9$, $V_6O_{11}$, $V_7O_{13}$, $V_8O_{15}$, $Ti_2O_3$, $Ti_4O_7$, $NbO_2$, $FeSi_2$, $VO_2NbO_2$, $V_{1-x}Mo_xO_2$, $VO_2$-$TiO_2$, $V_2O_3$-$Ti_2O_3$, $V_{1-x}Ge_xO_2$, $V_{1-x}Nb_xO_2$, $V_{1-x}Cr_xO_2$;$(Cr_xV_{1-x})_2O_3$ and $V_{1-x}Ti_xO_2$ can perform analogous operations. The oxide compounds forming the group are generally characterized by their narrow 3d bands and, typically, energy gaps within the range extending from 0.1 eV to 0.4 eV. A further common trait is their periodic table location, wherein the compounds tend to be oxides of elements in either group VB or IVB.

The compounds constituting this group undergo a phase transition in response to externally introduced stimuli of thermal energy, hydrostatic pressure or electric field. The phase change exhibited is between metallic and non-metallic states, which, as a general rule, are coextensive with their being highly reflective or nonreflective (transmissive) to incident luminous energy.

When a compound from this group is used in the fabrication of an output coupler for a laser resonating cavity, it functions as the cavity mirror while in the reflective state and as a substantially transparent output window when stimulated into its transmissive state. The simplicity of this single device is strikingly apparent when it is compared to the conventional methods of extracting laser energy from the gain medium of a laser resonating cavity.

The semiconducting oxide compounds from the above defined group may be fabricated as individual crystals or thin films, the latter being deposited onto a transparent substrate or sandwiched between layers thereof.

Another characteristic exhibited by this group of compounds, further accentuating their suitability for laser applications, resides in the abrupt rate of the transition between states. When appropriately controlled by means of the prescribed stimuli, pulse widths ranging from microseconds to nanoseconds, with repetition rates in the range of megahertz, are fully contemplated.

DESCRIPTION OF THE PREFERRED EMBODIMENT

Figure 1A:
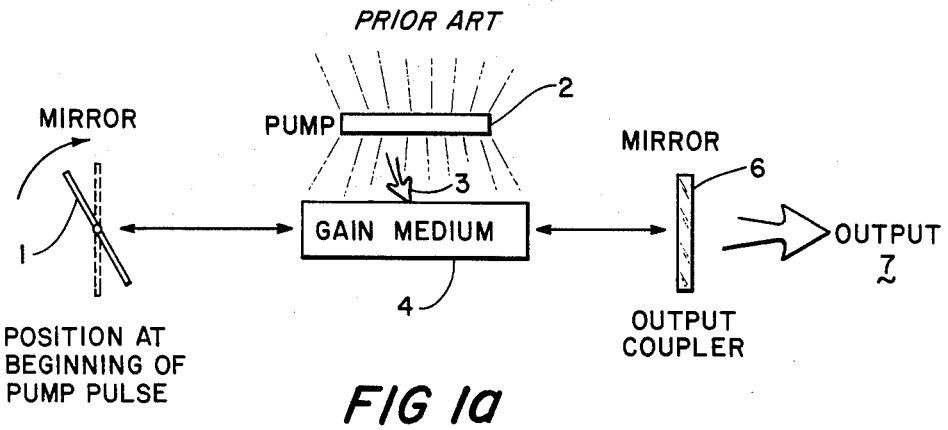
FIGS. 1*a* and 1*b* schematically show the respective layouts of a conventional Q-switched laser and a conventional cavity dumped laser.
Figure 1B:
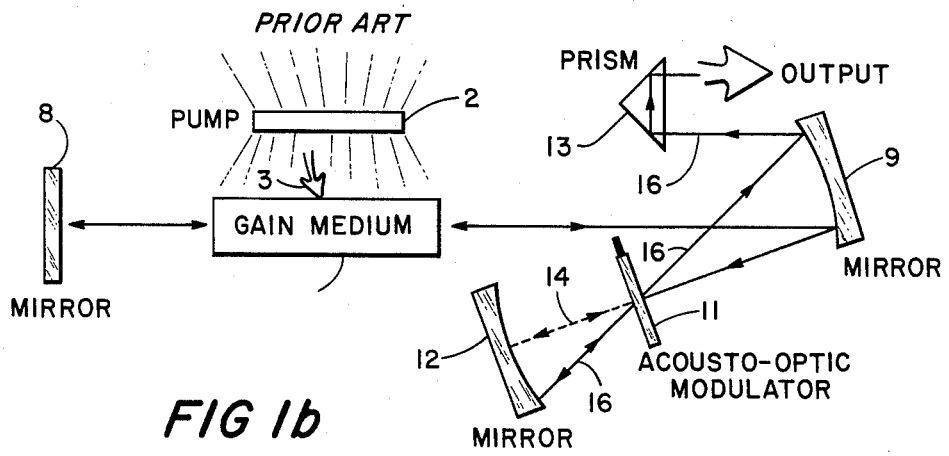

FIGS. 1*a* and 1*b* schematically represent two of the many conventional laser configurations, these two being known in the parlance of the art as a Q-switched laser and a cavity dumped laser, respectively. In the Q-switched laser of FIG. 1*a* rotating mirror 1 is synchronized with the transmission of luminous energy 3 from flash lamp type pump 2 into gain medium 4 of the laser's resonating cavity. When mirror 1 rotates into alignment, lasing commences. Output coupling mirror 6 normally transmits about 30% of the incident luminous energy, reflecting the remainder back into gain medium 4. Thereby, laser output 7 consists of pulses having a repetition rate corresponding to the rotation rate of mirror 1.

The cavity dumped configuration in FIG. 1*b* extracts a laser pulse by deflecting the luminous energy beam. As with the Q-switched configuration pump 2 supplies luminous energy 3 to gain medium 4 of the laser resonating cavity. At one end of gain medium 4 is stationary mirror 8, while the luminous path from the other end of gain medium 4 communicates with mirror 9, acousto-optic modulator 11, mirror 12, and at times prism 13. Since the configuration in FIG. 1*b* is well known, it need only be noted that stimulation of acousto-optic modulator 11 alters the path of incident luminous energy onto the path defined by reference line 16. Without stimulation, luminous energy passing through acousto-optic modulator 11 follows the path defined by dashed line 14, effectively being retroreflective as to gain medium 4.

The central feature of the invention is a utilization of oxide compounds from a defined group to directly control the luminous energy leaving the resonating cavity of a laser. When stimulated, compounds from this group respond by undergoing a transition between metallic and non-metallic states, which correspond to reflection or transmission of the incident luminous energy.

The compounds to which this invention pertains are generally semiconducting oxides of elements found in Group VB or IVB of the periodic table, and are further characterized by their narrow 3d bands and energy gaps ranging from 0.1 to 0.4 ev. In particular, the group consists of VO, $VO_2$, $V_2O_3$, $V_4O_7$, $V_5O_9$, $V_6O_{11}$, $V_7O_{13}$, $V_8O_{15}$, $Ti_2O_3$, $Ti_4O_7$, $V_3O_5$, $NbO_2$, $FeSi_2$, $VO_2NbO_2$, $V_{1-x}Mo_xO_2$, $VO_2$-$TiO_2$, $V_2O_3$-$Ti_2O_3$, $V_{1-x}Ge_xO_2$, $V_{1-x}Nb_xO_2$, $V_{1-x}Cr_xO_2$, $(Cr_xV_{1-x})_2O_3$ and $V_{1-x}Ti_xO_2$.

Figure 2A:
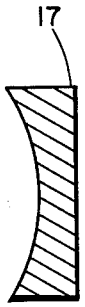
FIG. 2*a* schematically depicts a single crystal structure fabricated from one of the oxide compounds in the group.
Figure 2B:
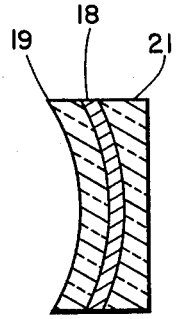
FIG. 2*b* is a schematic of another embodiment, wherein a thin film of the compound is sandwiched between transparent materials.

Structurally, the materials may be fabricated in the form of a single crystal, as shown by reference 17 in FIG. 2*a*, or may take the form of a thin film, such as thin film 18 sandwiched between layers 19 and 21 of transparent material. The latter embodiment is schematically depicted in FIG. 2*b*.

Figure 3A:
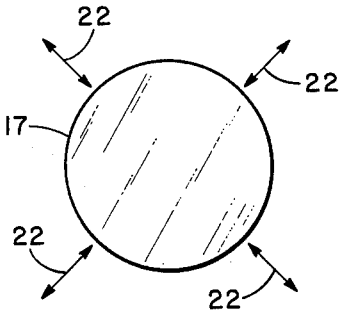
FIGS. 3*a* through 3*d* consist of four schematics embodying differing forms of stimuli; in which 3*a* shows radial hydrostatic pressure to an individual crystal, 3*b* shows the use of hydrostatic pressure with a thin film sandwich, 3*c* depicts the application of thermal energy, and 3*d* shows a thin film structure stimulated by an electric field.
Figure 3B:
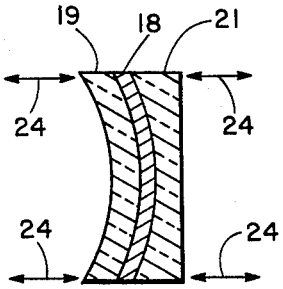
Figure 3C:
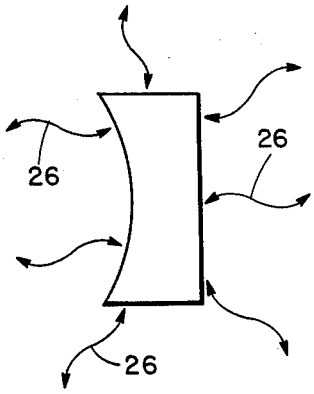

All materials in the defined group exhibit a transition phenomenon in response to externally introduced stimuli of hydrostatic pressure, thermal energy or electric field. FIG. 3*a* depicts the application of radial pressure 22 to single crystal 17. The stimulation in FIG. 3*b* is analogous, where hydrostatic pressure 24 is applied to exterior layers 19 and 21 to compress thin film 18 sandwiched therebetween. The use of thermal energy 26, depicted schematically in FIG. 3*c*, can be used with either structural form.

Figure 3D:
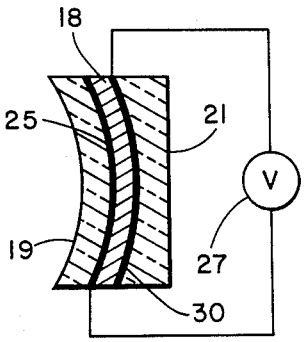

Although it is recognized that the transition will occur under an imposed thermal or pressure stimulus, the utility of the output coupler of the present invention resides in its ability to transition at controllably repetetive rates in the megahertz range under an applied electrical stimulus. Therefore, FIG. 3*d*, shows the preferred embodiment hereof in the form of a thin film, 18, of a compound from the group sandwiched between transparent exterior layers 19 and 21. This schematic also shows the presence of two electrically conductive intermediate layers 25 and 30, and an external voltage supply 27 attached thereto. Conductive layers 25 and 30 would preferably be thin electrically conducting films fabricated from materials which are transparent at the wavelength of the luminous energy transmitted through the device. For example if operation is desired in the infrared region of the spectrum, conductors made of $In_2O_3$ or Sb would be appropriate.

The application of voltage 27 in the manner described creates an electric field across thin film 18 of the transition material. As an example of the relative magnitudes of voltage needed to induce transition, consider the compound $VO_2$. For a thin film of this particular material used in a relatively small output coupler voltage magnitudes ranging from 10 to 50 volts and electric current flows from 1 to 50 milliamperes are typical of that which is necessary to trigger a phase transition. Furthermore, since the transition between states is very abrupt, voltage source 27 is not restricted to a fixed value but may, when the application demands, include repetitive short duration pulses, either synchronized or free running.

Stimulation by the imposition of an electric field is not limited to structures in which the oxide compounds take the form of a thin film. If patterns of electrodes are plated or otherwise deposited onto two faces of a single crystal structure, the composite is amenable to stimulation by the electric field formed when a voltage is applied between the electrodes.

As noted previously, the central feature of the invention resides in the utilization of the above-described materials and devices to modulate, and thereby control, the luminous energy output from a laser resonating cavity. A schematic representation of one such embodiment appears in FIG. 4, where output coupler 28 is shown to be of the thin film sandwich configuration. Voltage control 29 is analogous to voltage source 27 in FIG. 3*d*, altered as necessary to synchronize with pump 2.

Figure 4:
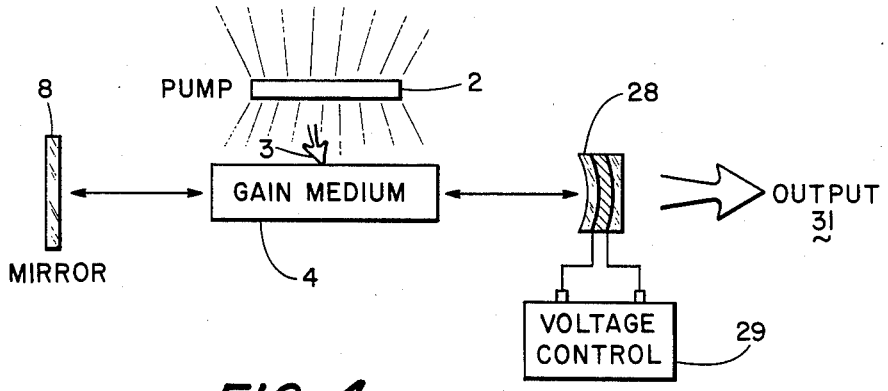
FIG. 4 contains a schematic depiction of a thin film sandwich device used as a laser output coupler at the control of an external voltage source.

Lasing of the resonating cavity in FIG. 4 commences when pump 2 has introduced sufficient energy 3 into gain medium 4 and output coupler 28 is stimulated into a reflective state. Luminous energy output 31 appears after voltage control 28 alters the stimulus to output coupler 28 sufficiently to cause a transition from the reflective state into the transmissive state. The configuration depicted in FIG. 4, and described with reference thereto, is operated in the mode commonly known as cavity dumped. Equally feasible is a Q-switched configuration of the general form depicted in FIG. 1*a*, in which the reflective function of rotating mirror 1 is performed by a phase transition material coupler element in changing from its transmissive state to its metallic state. In either case, the luminous energy output from the laser cavity is in the form of repetitive pulses, the rate of which is determined by the transition time between the reflective and non-reflective couplers rates.

Those skilled in the art will recognize the degree of simplification attained when a single output coupler, 28, replaces the plethora of optical and mechanical devices previously needed to regulate the luminous energy output from a comparable laser resonating cavity. A single device now accomplishes that which took rotating apertures, Kerr cells, Pocket effect crystals, dyes or destructable films in conventional lasers. Furthermore, the output coupler undergoes transition at the behest of an external control, and as such is operable repeatedly without degradation, thus being in distinct contrast to uncontrollable output coupling materials, such as germanium, which deteriorate rapidly with successive output pulses.

I claim:

1. An output coupler for the resonating cavity of a repetitively pulsed laser, comprising:

a. an optical device for controllably reflecting and transmitting luminous energy repetitively in response to an externally applied electric field, said device comprising a material selected from the group consisting of VO, $VO_2$, $V_2O_3$, $V_3O_5$, $V_4O_7$, $V_5O_9$, $V_6O_{11}$, $V_7O_{13}$, $V_8O_{15}$, $Ti_2O_3$, $Ti_4O_7$, $NbO_2$, $FeSi_2$, $VO_2NbO_2$, $V_{1-x}Mo_xO_2$, $VO_2$-$TiO_2$, $V_2O_3$-$Ti_2O_3$, $V_{1-x}Ge_xO_2$, $V_{1-x}Nb_xO_2$, $V_{1-x}Cr_xO_2$, $(Cr_xV_{1-x})_2O_3$ and $V_{1-x}Ti_xO_2$; and b. means for selectively applying an electric field across said device whereby said optical device material is selectively stimulated to transition between the metallic, optically reflective state and the semiconducting, optically transmissive state.

2. The output coupler as recited in claim 1, wherein said optical device further comprises a thin film of said material sandwiched between substrates which are transparent to said luminous energy.

3. The output coupler as recited in claims 1 or 2, wherein said means for applying an electric field across said optical device material comprises two substantially transparent juxtaposed metallic electrodes deposited on said material and locating said material therebetween, and a controllable source of electric voltage connected across said electrodes.

* * * * *